O. A. SEPPALA.
AUTOMOBILE FENDER.
APPLICATION FILED JULY 26, 1911.
1,018,085.
Patented Feb. 20, 1912.
3 SHEETS—SHEET 1.
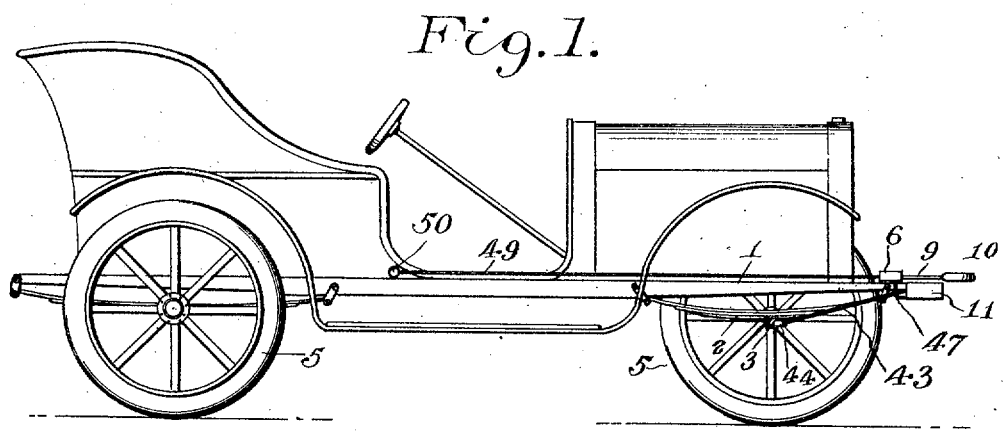
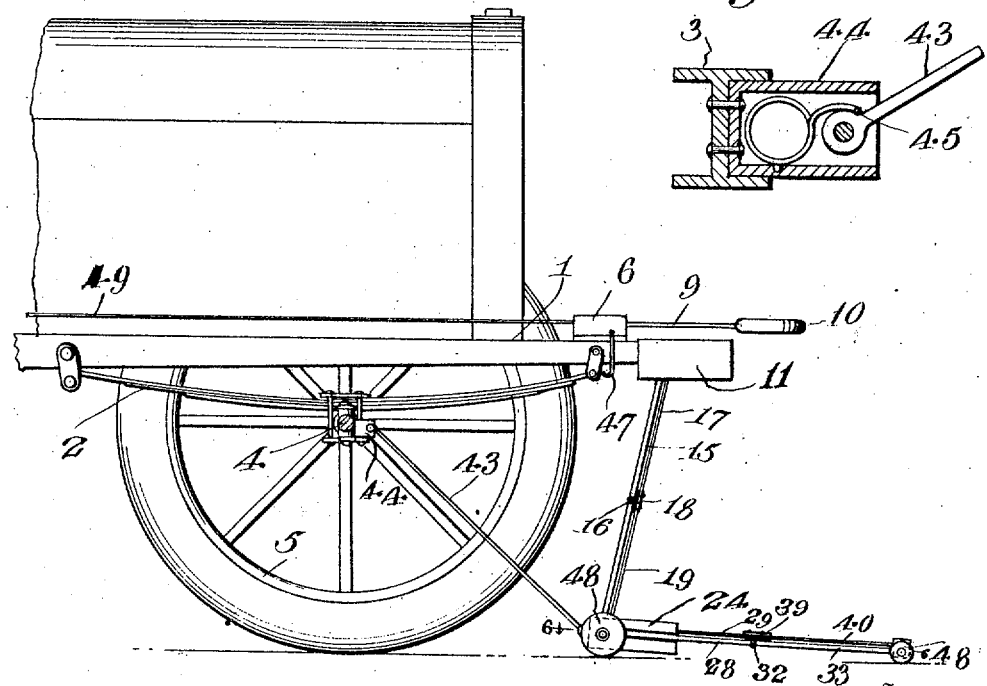
Witnesses:
J. P. Wahler.
H. H. Parsons.
Inventor
O. A. Seppala.
By Harry Ellis Chandler
Attorney O. A. SEPPALA.
AUTOMOBILE FENDER.
APPLICATION FILED JULY 26, 1911.
1,018,085.
Patented Feb. 20, 1912.
3 SHEETS—SHEET 2.
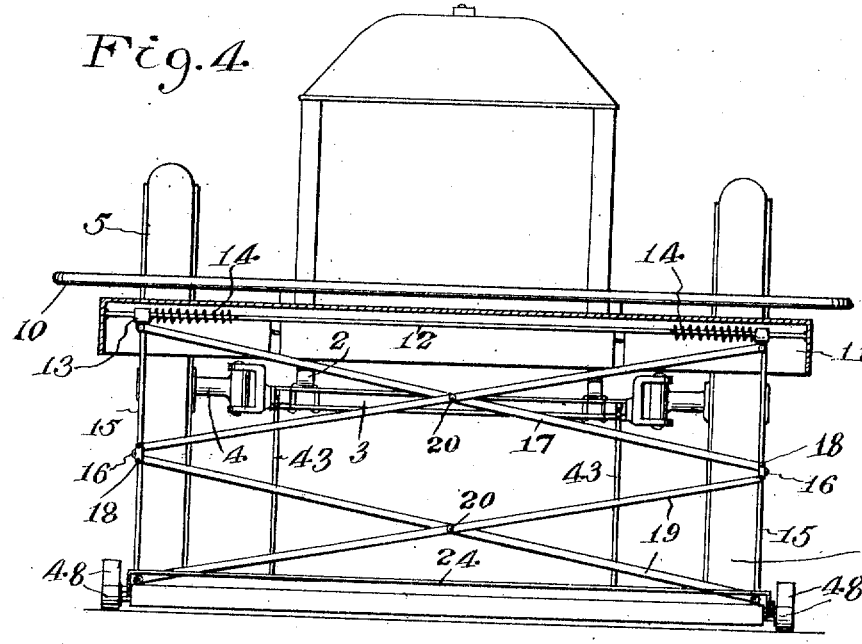
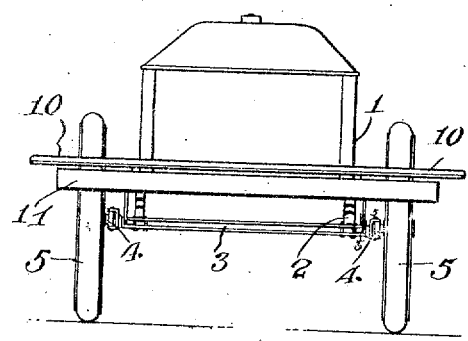
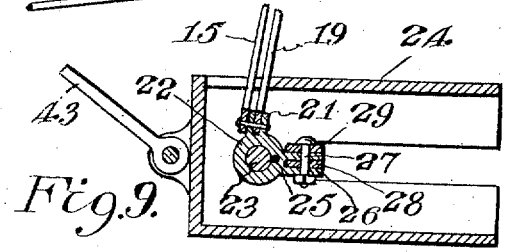
Inventor
O. A. Seppala.
By Harry Ellis Chandler
Attorney
Witnesses:
J. P. Wahler
A. K. Parsons

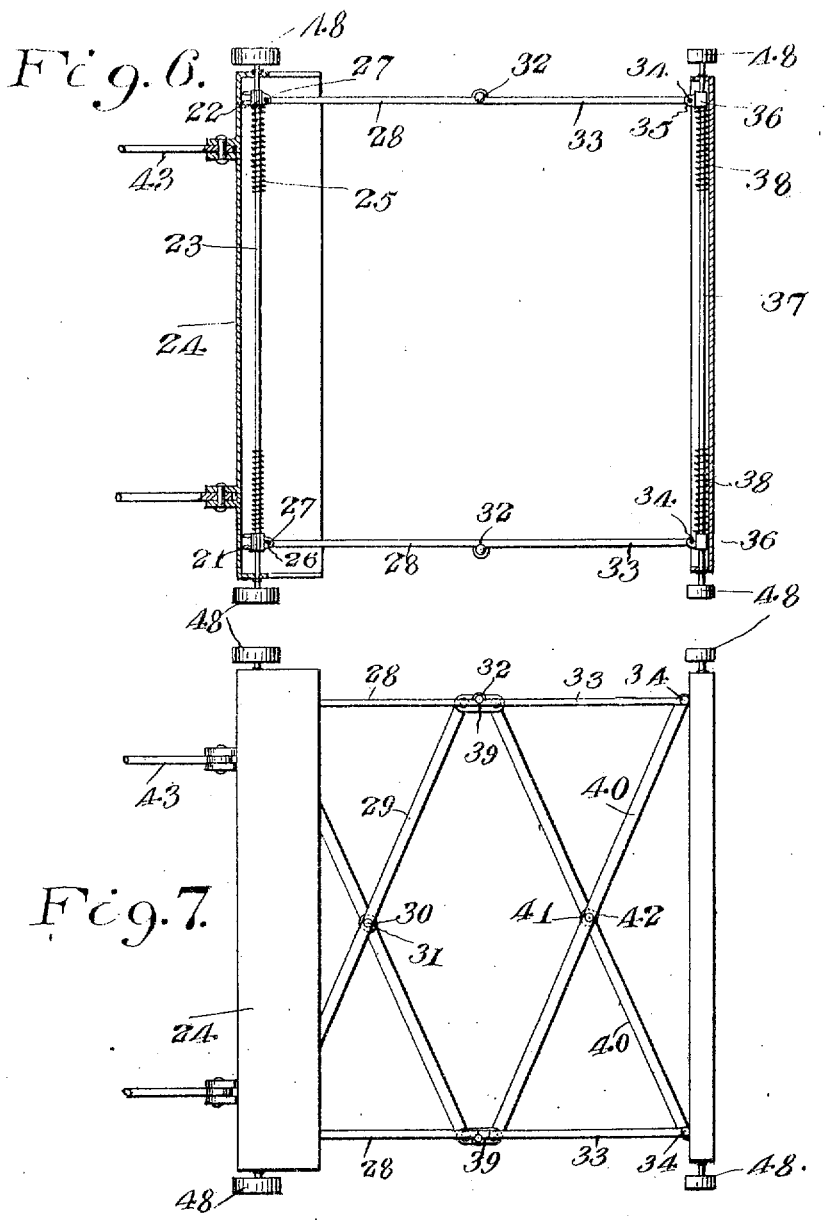

UNITED STATES PATENT OFFICE.

OSCAR A. SEPPALA, OF CHICAGO, ILLINOIS.

AUTOMOBILE-FENDER.

1,018,085.     Specification of Letters Patent.     Patented Feb. 20, 1912.

Application filed July 26, 1911. Serial No. 640,639.

*To all whom it may concern:*

Be it known that I, OSCAR A. SEPPALA, a citizen of the United States, residing at Chicago, in the county of Cook and State of Illinois, have invented certain new and useful Improvements in Automobile-Fenders, of which the following is a specification.

My invention relates to improvements in fenders and has particular reference to an improved form of fender particularly adapted for use upon motor vehicles.

The leading object of my invention is the provision of an improved device which may be readily secured to the frame of an automobile and which will be controlled by the movement of the bumper bar of the automobile, whereby an object striking against said bar will cause my device to unfold and provide a fender to prevent said object falling under the car or the wheels.

The further object of my invention is the provision of an improved collapsible fender for automobiles which will be normally contained within a small box or casing but which when unfolded will provide a complete guard or fender to absolutely prevent a person or animal from being run over by the automobile.

Another object of my invention is the provision of an improved fender attachment of this type for automobiles which shall be so supported as to be released either by contact of an object with the bumper bar of an automobile or may be manually released by the chauffeur.

Other objects and advantages of my improved fender will be readily apparent by reference to the following description taken in connection with the accompanying drawings, and it will be understood that I may make any modifications in the specific structure shown and described within the scope of my claims without departing from or exceeding the spirit of the invention.

Figure 1 represents a side elevation of an automobile equipped with my improved fender showing the same in raised or folded position. Fig. 2 represents a similar view showing my fender in unfolded or operative position. Fig. 3 represents a front view of the automobile and attachment in the position occupied by the parts in Fig. 1. Fig. 4 represents a similar view to Fig. 3 showing the fender in lowered position. Fig. 5 represents a sectional view on the line 5—5 of Fig. 3. Fig. 6 represents a sectional view on the line 6—6 of Fig. 2. Fig. 7 represents a bottom plan view of the ground engaging portion of the fender. Fig. 8 represents an enlarged detailed view of the means for securing the fender in raised position, and for releasing the fender, and Fig. 9 represents a fragmentary sectional view on the line 8—8 of Fig. 8.

In the drawings, the numeral 1 designates the body of the automobile having secured thereto the springs 2 from which depends the front shaft or spindle 3 to which is pivoted the stub axles 4 of the front wheels 5. Secured to the automobile adjacent the bonnet thereof on each side is a cylinder 6 containing a helical spring 7, while mounted in the cylinder and bearing against the spring is a piston 8 having a piston rod 9 projecting forward from the cylinder 6, the rods 9 on each side being connected by the bumper bar 10 having curved ends projecting laterally beyond the wheels 5.

Secured to the machine beneath the cylinders 6 and extending transversely of the machine is the metal casing 11 for normally containing my fender, said casing being open on the under side to allow the parts to be readily forced upward or automatically moved downward with respect to the casing. Journaled in the ends of the said casing is a shaft 12 on which are slidably mounted the collars 13 drawn toward each other by the springs 14 secured on the shaft, while pivoted to each of the collars are the pair of inwardly bending levers 15 connected by a toggle joint 16. Pivotally secured to the said collars 13 and slightly spaced from the levers 15 are the lazy tong levers 17 having secured to their ends plates 18, a second set of levers 19 being also pivoted to the plates 18. It will thus be seen that the contraction of the collars 13 caused by the springs 14 will act on the lazy tong levers 17 and 19 to cause the same to spread downward, the various levers being intermediately connected by the pivot pins 20 in the usual manner.

The ends of the levers 19 and likewise the ends of the toggle levers 15 are pivoted on the lugs 21 projecting rearwardly from the collars 22 which are slidably mounted upon the shaft 23, a casing 24 having its ends secured to the ends of the said shaft. Springs 25 are coiled around the shaft 23 and have one end secured thereto and the other end secured to the collars 22' to tend to turn the collars on the shaft 23 and also having some tendency to draw the collars 22' together. Said collars 22' have extending therefrom the ears 26 through which pass the pivots 27, while secured on the pivots 27 are the toggle levers 28 and the lazy tong levers 29, said latter levers being intermediately connected by the bolt 30, a washer 31 being interposed between the levers to facilitate the ready turning thereof. Secured to the ends of the toggles 28 by the toggle joint 32 are the other toggle levers 33 having their ends pivoted by the bolts 34 to the ears 35 of the collars 36. Said collars are mounted on the shaft 37 and springs 38 are coiled on the shaft and have one end secured to the shaft and the other to the collars to force the collars toward each other.

Pivoted to the free ends of the lazy tong levers 29 are the plates 39 to which are also pivoted the second lazy tong levers 40 intermediately pivoted to each other by the bolt 41 and having interposed therebetween the washer 42, the other ends of the levers 40 being pivotally mounted on the pivot pins 34, but being disposed on the opposite side of the ears 35 from that on which the levers 33 are located.

It will thus be seen that the collars 22 and 36 normally move inward on the rods or shafts 23 and 37, and this movement causes the lazy tongs to elongate and force the two shafts apart, said movement continuing until the toggle levers 28 and 33 are straightened, when the locking of the toggle joints 32 prevents the forcing of the shafts 23 and 37 toward each other until said joints have first been bent inward.

In the use of my invention, I pivot to the casing 24 the brace levers or bars 43, the other ends of the brace members 43 being rotatably mounted in the castings 44 which are secured to the front shaft 3 of the automobile and contain springs 45 tending to force the bars downward. When my invention is in normal or inoperative position the various toggle and lazy tong levers are folded into the casings 24 and 11, the bars 43 being provided with eyes 46 for engagement by the hooks 47 carried by the buffer cylinders 6, said hooks holding the bars and thus the entire device in raised position. The upper ends of the hook members project into the cylinder 6, and when a person is struck by the bumper bar 10 the inward movement of the piston rods 9 will cause the same to engage the inner ends of the hooks to swing them into releasing position, when the action of the various springs will move my fender into open position.

To allow the fender to move forward readily over the ground when opened I preferably mount on the ends of the shafts 23 and 37 the rollers or wheels 48, while to enable me to drop the fender from within the automobile, I secure to the upper ends of the hooks 47 the wires or flexible connections 49 terminating in the handle 50 disposed at the dash board, a pull on the said handle serving to move the hooks to release the fender.

From the foregoing description taken in connection with the accompanying drawings the construction and operation of my improved fender attachment for automobiles will be readily understood, and it will be seen that I have provided an attachment which can be readily secured to an automobile and which while normally out of the way to not interfere with the movement of the automobile will automatically drop when the bumper bar strikes a person to prevent the person from passing under the wheels or which may be manually operated to drop in this manner.

I claim:

1. The combination with an automobile, of a fender therefor comprising a casing, and a back portion and ground engaging portion containable within said casing, said portions including spring operated lazy tong levers for opening the fender.

2. An automobile fender including a containing casing, a shaft in the casing, a pair of collars loosely mounted on the shaft, springs coiled on the shaft and having one end secured to the collars for drawing the collars inward and rotating the same, lazy tongs and toggle levers pivoted to the collars, collars pivoted to the forward ends of the lazy tongs and toggle levers, and springs for drawing the latter collars together, whereby the movement together of the two pairs of collars causes the lazy tongs to stretch out until their movement is limited by the toggle levers and the toggle levers serve to lock the lazy tongs against movement to hold the fender in extended position.

3. An automobile fender comprising a back section and a ground engaging section, each of said sections including spring pressed lazy tong levers for opening the same and toggle levers for locking the same in open position.

4. An automobile fender comprising a back section and a ground engaging section, each of said sections including spring pressed lazy tong levers for opening the same, toggle levers for locking the same in open position, and means for manually or automatically releasing the fender to allow the spring pressed lazy tong levers to open the same.

In testimony whereof I affix my signature, in the presence of two witnesses.

OSCAR A. SEPPALA.

Witnesses:
 JOSEPH J. EHRET,
 CHAS. M. ENGEL.